A. T. RANSOM.
WAVE AND GRAVITY MOTOR.
APPLICATION FILED DEC. 22, 1908.
929,982.
Patented Aug. 3, 1909.
2 SHEETS—SHEET 2.
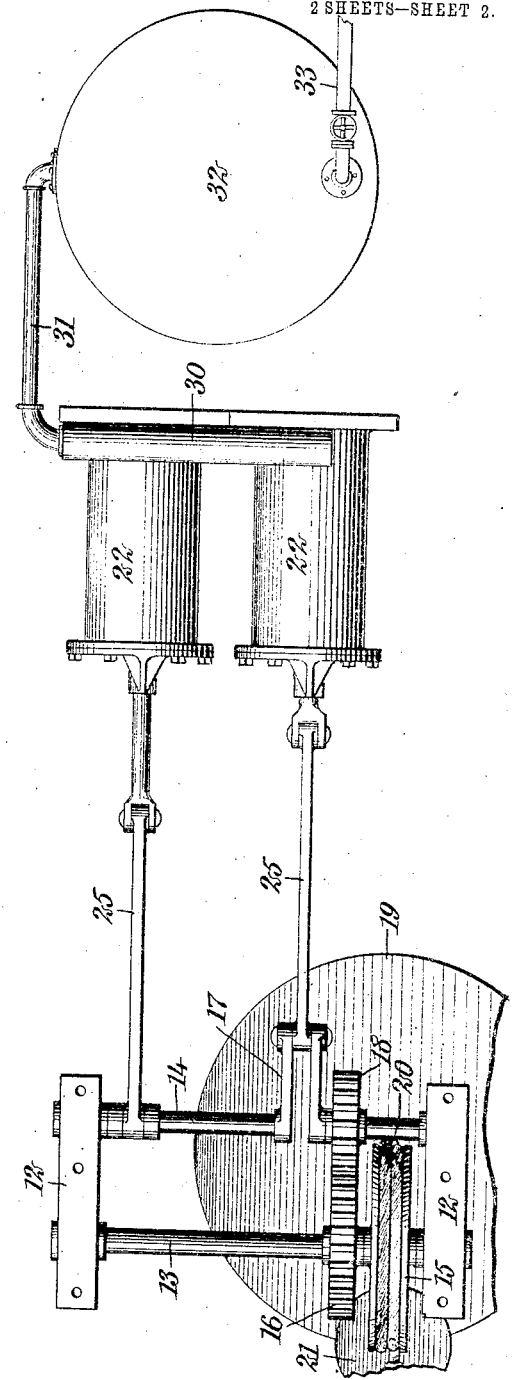
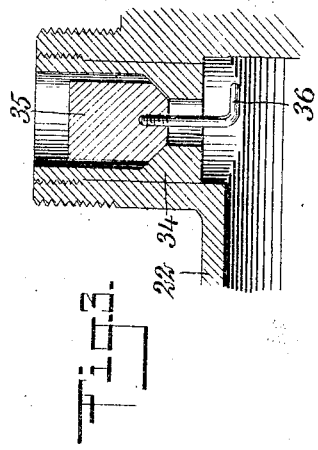
WITNESSES
INVENTOR
Allen T. Ransom
BY
ATTORNEYS

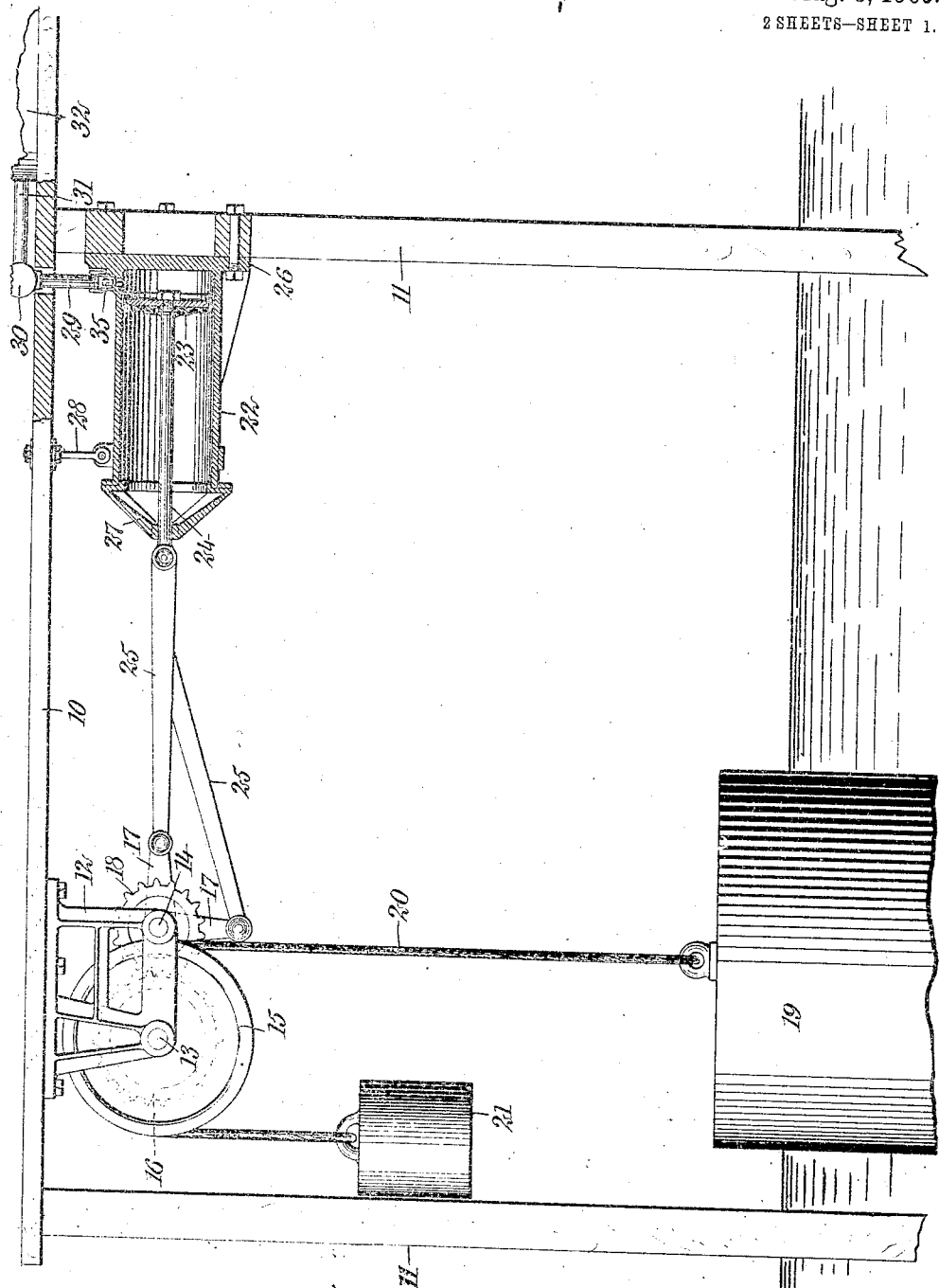

UNITED STATES PATENT OFFICE.

ALLEN T. RANSOM, OF NEW YORK, N. Y.

WAVE AND GRAVITY MOTOR.

No. 929,982.  Specification of Letters Patent.  Patented Aug. 3, 1909.

Application filed December 22, 1908. Serial No. 468,794.

*To all whom it may concern:*

Be it known that I, ALLEN T. RANSOM, a citizen of the United States, and a resident of the city of New York, borough of Brooklyn, in the county of Kings and State of New York, have invented a new and Improved Wave and Gravity Motor, of which the following is a full, clear, and exact description.

This invention relates to certain improvements in wave and gravity motors, and more particularly to a special arrangement of parts, whereby the power of the waves of the sea or ocean is utilized alternately with the power of gravity, for operating mechanism and utilizing said mechanism directly in the compression of air.

The mechanism involves simple means for compressing air and storing it under pressure, and the compressed air may be piped to any point desired, so that the energy of the waves and gravity may be utilized at a considerable distance from the scene of activity of the waves.

Reference is to be had to the accompanying drawings, forming a part of this specification, in which similar characters of reference indicate corresponding parts in all the figures, and in which—

Figure 1 is a side elevation of a mechanism constructed in accordance with my invention, a portion thereof being shown in section; Fig. 2 is a top plan view thereof, the supporting floor being removed; and Fig. 3 is a detail section of the outlet valve of the compressor.

My improved mechanism is connected to any suitable support at any point where the variation in the water level is continually changing, due to the action of waves, tide, or other causes. As illustrated, I provide a platform or floor 10, mounted upon any suitable form of standards, piers, or posts 11, and to the under side of the platform 10 is secured the mechanism constituting the essential portion of my invention. Two hangers 12 are bolted or otherwise rigidly secured to the under side of the platform 10, and these hangers support two parallel shafts 13 and 14. The shaft 13 carries a drum 15 and a gear wheel 16, while the shaft 14 has one or more cranks 17 and a gear wheel 18 of smaller diameter than the gear wheel 16. Beneath the drum 15 is a float 19 connected by a cord 20 to a counterbalancing weight 21. The cord extends entirely around the drum once, and its ends depend therefrom and are held taut by the weight and the float.

The platform, together with one of the posts 11, support one or more air compressor cylinders 22 at substantially the same elevation as the two shafts 13 and 14. Within each cylinder is a corresponding piston 23, and the piston rod 24 is connected by a connecting rod 25 to the corresponding crank 17 of the shaft 14. The cylinder head opposite to the shafts, is preferably provided with flanges 26, which are rigidly bolted to the post 11, and the opposite end of the cylinder is provided with a spider 27 for guiding the piston rod. The last-mentioned end of the cylinder is supported from the platform by a suitable bolt 28, which tends to hold the latter more steady. The end of the cylinder opposite to the shafts is provided with a valve-controlled outlet passage communicating with an upwardly-extending conduit 29 leading to a manifold 30. All of the separate compressors have their own discharge conduits 29 leading to the manifold 30, and the manifold is connected by a conduit 31 to a suitable storage tank 32. The air may be drawn off from a storage tank through a valve-controlled conduit 33 and led to any point at which it is desired to use the same.

The weight and float are so proportioned to each other that a lowering of the water level causes a lowering of the float and the raising of the weight, while when the water level rises, the weight 21 is sufficiently heavy to cause a positive rotation of the shaft 13 in the reverse direction. Thus the weight operates to rotate the shaft in one direction by gravity and the float operates to rotate the shaft in the opposite direction by the recedence of the waves. In case a plurality of cranks 17 are employed, they are set at different angles, so as to render the load on the shaft more uniform.

To simplify the construction to the minimum and avoid the use of complicated valves, one end of each pump cylinder is left open and the piston is so constructed that the air may pass the piston during the movement of the latter in one direction. Thus it is not necessary to employ any inlet valve other than the piston washer. The outlet valve is preferably constructed substantially as shown in Fig. 3. Within the outlet passage is a plug 34 having a conical valve seat, and upon this seat rests a weighted valve 35, which may be lifted by the air pressure to permit the air to pass it from the cylinder. The valve is slightly smaller than the bore of the plug, so that air may readily pass the plug, and the plug carries a downwardly-extending hook or stem 36, which engages with the lower end of the valve and prevents the valve from being forced up into the pipe or in any other way displaced by the compressed air.

Having thus described my invention, I claim as new and desire to secure by Letters Patent:

1. An apparatus of the class described, comprising a platform, standards supporting the platform, hangers depending from the platform, two parallel shafts mounted in the hangers and geared together, one of the shafts being provided with a crank, a drum on one shaft, a cable wound around said drum, a weight on one end of the cable, a float on the other end of said cable, an air compressor cylinder having one end secured to one of the standards below the platform and its other end connected with the said platform, a storage tank, a valved connection between the tank and cylinder, a piston in the cylinder, and a pitman connecting the piston rod with the said crank.

2. An apparatus of the character described, comprising an elevated platform, hangers depending from the platform, two parallel shafts mounted in the hangers, one of the shafts being provided with two cranks set at different angles, gearing connecting the shafts, a drum on one shaft, a cable extending around the drum, a weight on one end of the cable, a float on the other end of said cable, two air compressor cylinders arranged below the platform, pistons in the cylinders, pitmen connecting the piston rods with the said cranks, a manifold, a valved connection between each cylinder and the manifold, and a storage tank with which the manifold is connected.

In testimony whereof I have signed my name to this specification in the presence of two subscribing witnesses.

ALLEN T. RANSOM.

Witnesses:
CLAIR W. FAIRBANK,
GEORGE RICHTER.